US008676033B2

(12) United States Patent
Han et al.

(10) Patent No.: US 8,676,033 B2
(45) Date of Patent: Mar. 18, 2014

(54) METHOD AND APPARATUS FOR EXTRACTING KEY FRAMES FROM A VIDEO (75) Inventors: Bo Han, Beijing (CN); Yuyu Liu, Beijing (CN)

(73) Assignee: Sony Corporation, Tokyo (JP)

(*) Notice: Subject to any disclaimer, the term of this patent is extended or adjusted under 35 U.S.C. 154(b) by 42 days.

(21) Appl. No.: 13/228,910

(22) Filed: Sep. 9, 2011

(65) Prior Publication Data
US 2012/0063746 A1 Mar. 15, 2012

(30) Foreign Application Priority Data

Sep. 13, 2010 (CN) .......................... 2010 1 0281275

(51) Int. Cl.
*G11B 27/00* (2006.01)

(52) U.S. Cl.
USPC ........................................................ 386/278

(58) Field of Classification Search
USPC ........... 345/475; 348/590; 375/240; 382/225; 386/241, 278; 715/255, 723
See application file for complete search history.

(56) References Cited

U.S. PATENT DOCUMENTS

| 5,956,026 | A | * | 9/1999 | Ratakonda | 715/723 |
| 6,560,281 | B1 | * | 5/2003 | Black et al. | 375/240 |
| 6,771,268 | B1 | * | 8/2004 | Crinon | 345/475 |
| 6,807,306 | B1 | * | 10/2004 | Girgensohn et al. | 382/225 |
| 2003/0210886 | A1 | * | 11/2003 | Li et al. | 386/46 |
| 2005/0094901 | A1 | * | 5/2005 | Seol et al. | 382/305 |
| 2005/0180730 | A1 | * | 8/2005 | Huh et al. | 386/52 |
| 2005/0228849 | A1 | * | 10/2005 | Zhang | 709/200 |
| 2006/0193387 | A1 | * | 8/2006 | Wu et al. | 375/240.16 |
| 2007/0226624 | A1 | * | 9/2007 | Peker et al. | 715/719 |
| 2007/0237225 | A1 | * | 10/2007 | Luo et al. | 375/240.12 |
| 2010/0125581 | A1 | * | 5/2010 | Peleg et al. | 707/737 |
| 2013/0014016 | A1 | * | 1/2013 | Delgo et al. | 715/723 |

OTHER PUBLICATIONS

Zhu et al. "Exploring video content structure for hierarchical summarization", Multimedia Systems 2004;10(2):98-115.*
Amiri et al. "Hierarchical keyframe-based video summarization using QR-decomposition and modified k-means clustering", EURASIP Journal on Advances in Signal Processing, vol. 2010, Feb. 2010, Article No. 102.*
Ferman et al. "Two-stage hierarchical video summary extraction to match low-level user browsing preferences", Multimedia, IEEE Transactions on, Jun. 2003, vol. 5 , Issue: 2, pp. 244-256.*

* cited by examiner

*Primary Examiner* — Thai Tran
*Assistant Examiner* — Stephen Smith
(74) *Attorney, Agent, or Firm* — Oblon, Spivak, McClelland, Maier & Neustadt, L.L.P.

(57) ABSTRACT

The present invention relates to a method and apparatus for extracting key frames from a video. The method includes: dividing the video into multiple levels of video segments, wherein each video segment at a non-lowest level comprises one or more video segments at the next lower level, the multiple levels range from a first level to an N-th level, N is an integer greater than 1, the first level is the lowest level, and the N-th level is the highest level; extracting from video segments of the video at a non-highest level candidate frames at the non-highest level; for each level from a next higher level to the highest level, selecting zero, one or more candidate frames at the level from candidate frames at the next lower level in each video segment at the level; and outputting the candidate frames at the highest level as the key frames of the video.

18 Claims, 4 Drawing Sheets

METHOD AND APPARATUS FOR EXTRACTING KEY FRAMES FROM A VIDEO

FIELD OF THE INVENTION

The present invention relates to processing and analysis of a video, and in particular to a method and apparatus for extracting key frames from a video.

BACKGROUND OF THE INVENTION

In daily lives, a long article we read is usually provided with a brief abstract, and a book is generally provided with a catalogue. Along with the continuous development of the information technology, a video becomes a kind of indispensable media in modern life. Accordingly, it becomes an important task to create an abstract for video contents so as to facilitate a user's browsing and searching. For a part of video contents (such as a movie), the video abstract can be created manually. However, for many video contents (such as network shared videos), the manual way becomes impractical due to a lot of hours and money to be consumed. For these applications, a technology for generating an abstract of a video automatically by a computer is very important.

Vision related parts in a video consist of a series of frames arranged in a temporal order. It is an intuitional and effective way to extract a most representative key frame as an abstract of the video from the frames. In existing technologies, it is generally to extract candidate key frames from the shots or sub-shots of a video. How to select a key frame of the entire video from the candidate frames to allow a user to effectively understand the outline of the video by browsing key frames as few as possible is an important technology for automatic video abstract.

SUMMARY OF THE INVENTION

A brief summary of the present invention will be given below, so as to provide a basic understanding regarding some aspects of the present invention. It should be understood that the summary is not an exhausting overview regarding the present invention. It does not intend to establish the key or critical part of the present invention, nor intend to define the scope of the present invention. It only aims to give some concepts in a simplified form and take them as a preface for a more detailed description to be provided later.

A main object of the present invention is to provide a method for extracting key frames from a video.

According to an aspect of the present invention, a method for extracting key frames from a video comprises: dividing the video into multiple levels of video segments, wherein each video segment at a non-lowest level comprises one or more video segments at the next lower level, and the multiple levels range from a first level to an N-th level, where N is an integer greater than 1, the first level is the lowest level, and the N-th level is the highest level; extracting, from video segments of the video at a non-highest level, candidate frames at the non-highest level; for each level from a next higher level of the non-highest level to the highest level, selecting zero, one or more candidate frames at the level from the candidate frames at the next lower level comprised in each video segment at the level; and outputting the candidate frames at the highest level as the key frames of the video.

According to another aspect of the present invention, an apparatus for extracting key frames from a video comprises: a dividing unit configured to divide the video into multiple levels of video segments, wherein each video segment at a non-lowest level comprises one or more video segments at the next lower level, and the multiple levels range from a first level to an N-th level, where N is an integer greater than 1, the first level is the lowest level, and the N-th level is the highest level; an extracting unit configured to extract, from video segments of the video at a non-highest level, candidate frames at the non-highest level; a selecting unit configured to, for each level from a next higher level of the non-highest level to the highest level, selecting zero, one or more candidate frames at the level from the candidate frames at the next lower level comprised in the video segments at the level; and an outputting unit configured to output the candidate frames at the highest level as the key frames of the video.

In addition, an embodiment of the present invention further provides a computer program for implementing the method for extracting key frames from a video.

In addition, an embodiment the present invention further provides a computer program product in form of at least a computer readable medium, on which computer program codes for implementing the method for extracting key frames from a video are recorded.

The present invention can well balance the proportions of key frames from different content units of a video in a list of the key frames of the video, so as to achieve an effectively understood preview by using key frames as few as possible.

BRIEF DESCRIPTIONS OF THE DRAWINGS

The above and other objects, features and advantages of the present invention will be understood more readily with reference to the following description of the embodiments of the present invention in conjunction with the accompanying drawings. The parts in the drawings are only to show the principle of the present invention. In the drawings, similar or identical technical features or parts will be denoted with similar or identical reference signs.

DETAILED DESCRIPTIONS OF THE EMBODIMENTS

The embodiments of the present invention will be described below with reference to the drawings. The elements and features described in a figure or an embodiment of the present invention can be combined with the elements and features shown in one or more other figures or embodiments. It should be noted that, for the purpose of clarity, representations and descriptions of elements and processes which are known to those skilled in the art or are not related to the present invention, are omitted in the drawings and the description.

A method for extracting key frames from a video according to an embodiment of the present invention is described below with reference to FIG. 1.

Figure 1:
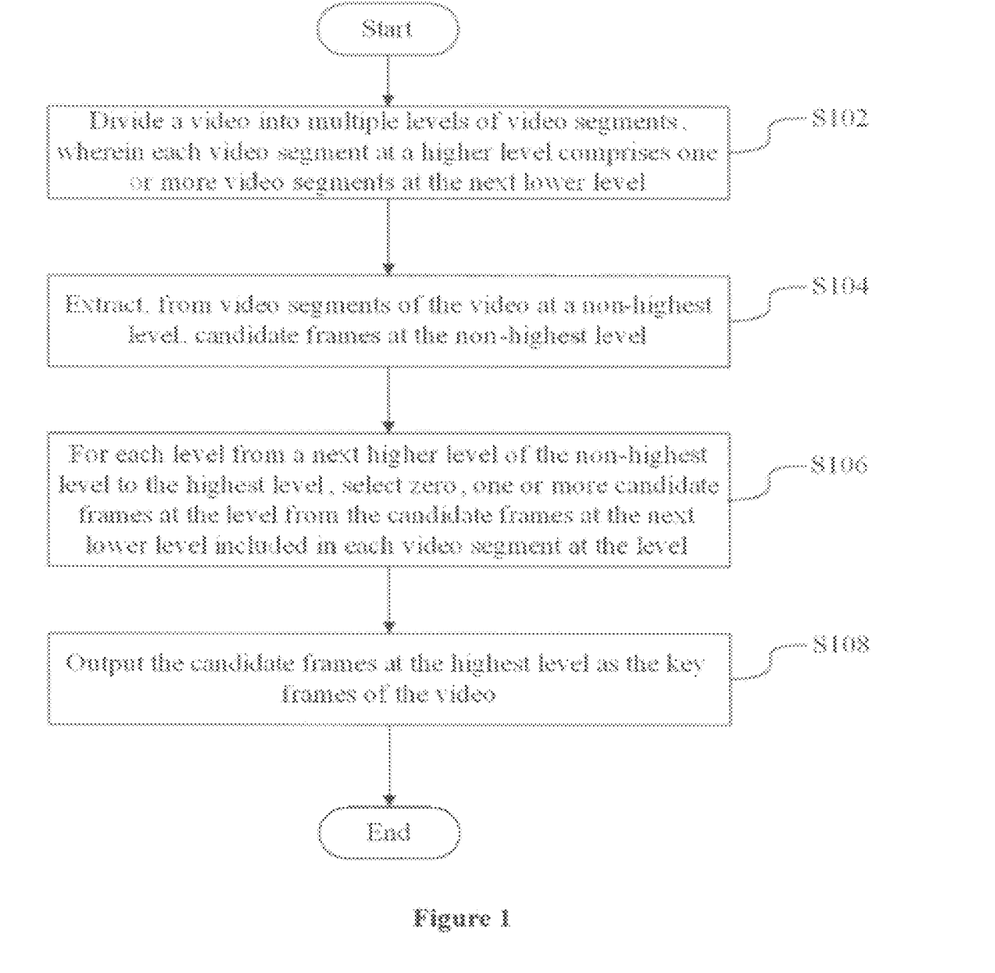
FIG. 1 is a flowchart of a method for extracting key frames from a video according to an embodiment of the present invention.

As shown in FIG. 1, in step S102, a video is divided into multiple levels of video segments, wherein each video segment at a non-lowest level includes one or more video segments at the next lower level. The multiple levels range from a first level to an N-th level, where N is an integer greater than 1. The first level is the lowest level, and the N-th level is the highest level. For example, the video can be divided into two levels of video segments, the video segments at the lower level are shots or sub-shots, and the video segments at the higher level are video chapters or scenes. In an example, the video can be divided into more than two levels of video segments. For example, the video can be divided into three or four levels of video segments according to a specific requirement. For example, in the case of three levels, the video segments at the first level can be sub-shots, the video segments at the second level can be shots, and the video segments at the third level can be scenes. The dividing of the sub-shots, shots or scenes can be implemented by those skilled in the art, and will not be detailed here. In another example, video segments at the first level can be divided by a regular time. In an example, there can be only one video segment at the highest level, that is, the entire video. Each candidate frame can represent a certain number of frames in the video. The sum of the numbers of video segments represented by all candidate frames at a same level is less than or equal to the total number of the frames of the video. There can be zero, one or more candidate frames at each level in a video segment at the level. For example, there can be zero, one or more scene candidate frames in one scene. In an example, each video segment at the lowest level has a candidate frame at the lowest level. In an example, each video segment at a non-lowest level has one or more candidate frames at the non-lowest level. For example, a scene can have two candidate frames at the scene level. These two candidate frames at the scene level respectively represent a part of frames of the scene. The total number of the frames represented by the two candidate frames at the scene level is less than the total number of the frames of the scene.

In step S104, candidate frames of a video at a non-highest level are extracted from video segments at the non-highest level. The non-highest level in the step can be the lowest level or a non-lowest level. For example, the intermediate frame, the starting frame, the ending frame or a randomly selected frame of a video segment at the non-highest level can be selected as the candidate frames at the non-highest level.

In step S106, for each level from a next higher level of the non-highest level described in step S104 to the highest level, zero, one or more candidate frames at the level are selected from the candidate frames at the next lower level included in the video segments at the level. Since candidate frames at a non-highest level are extracted in step S104, in step S106, candidate frames at a next higher level can be selected from the extracted candidate frames, and further selections of candidate frames can be made level by level, until the candidate frames at the highest level are obtained. Various methods can be used to select candidate frames at the present level from the candidate frames at the next lower level. For example, the number of candidate frames at the present level contained in a video segment at the present level can be substantially proportional to the number of the video segments at the next lower level contained in the video segment at the present level. Specifically, assuming the video segments at the present level are scenes, the video segments at the next lower level are shots, there are totally 100 shots in the video, and it is predetermined that there are 10 candidate frames at the present level, then for a scene containing 10 shots, one candidate frame at the level is to be selected from the scene. The first, the last, the intermediate or a randomly selected one of the candidate frames at the next lower level (i.e., the candidate frames at the shot level) contained in the scene can be used as a candidate frame at the present level (i.e., a candidate frame at the scene level). In an example, the number of the candidate frames at the present level contained in a video segment at the present level can be made basically proportional to the number of frames contained in the video segment at the present level. For different levels, different methods for selecting candidate frames at the present level from candidate frames at the next lower level can be used.

In step S108, the candidate frames at the highest level are outputted as the key frames of the video.

By selecting candidate frames level by level, proportions of key frames from different content units of a video in a list of the key frames of the video are balanced well, so as to implement a better preview effect.

In the present embodiment, the number of candidate frames at each level may or may not be determined in advance, and the numbers of candidate frames at one or more levels can be determined advance while the numbers of candidate frames at other levels are not determined advance. For example, at the shot level, the number of candidate frames at the level may not be determined in advance, but one candidate frame is selected from each shot as specified, thus the number of the candidate frames at such shot level is identical to the number of the shots contained in the video. For another example, the number of the key frames can be determined in advance according to the length of the video and/or preference of a user.

A method for extracting candidate frames at the present level from candidate frames at the next lower level in an example is detailed below with reference to FIG. 2. The method can be referred to as a method for selection. The method in FIG. 2 can be applied to one or more levels. That is, in step S106 of FIG. 1, for at least one M-th level ranging from the next higher level of the non-highest level to the highest level, M being an integer greater than 1, the step of selecting the candidate frames at the M-th level from the candidate frames at a (M−1)-th level included in the video segments at each M-th level can include step S602 to step S612. Optionally, the at least one M-th level can comprise the highest level.

Specifically, starting from the M-th level as the above mentioned non-highest level, in step S602, for each video segment at the M-th level, processing for removing approximately repetitive candidate frames is performed on the candidate frames at the (M−1)-th level of the video segment. For example, a method of clustering or a method of comparing frame by frame can be used to find the approximately repetitive candidate frames. Such a method can be implemented by those skilled in the art, and will not be detailed here. In an example, step S602 may not be executed. In other words, step S604 can be executed without the processing for removing approximately repetitive candidate frames.

In step S604, for each video segment at the M-th level, the candidate frames at the (M−1)-th level included in the video segment are ranked in order of large to small numbers of the frames represented by those candidate frames at the (M−1)-th level.

In step S606, for each video segment at the M-th level, a candidate frame which has not been selected as the candidate frame at the M-th level and is the highest ranked in the candidate frames at the (M−1)-th level in the video segment is chose to participate in the selection.

In step S608, the number of votes for each participated candidate frame is calculated according to the number of frames represented by the participated candidate frame and the number of votes supported by other candidate frames, which have not been determined as candidate frames at the M-th level, in the video segment at the M-th level where the participated candidate frame locates. The sum of the number of votes for each participated candidate frame and the total number of frames represented by the determined candidate frames at the M-th level in the video segment at the M-th level where the participated candidate frame locates is not greater than the total number of frames of the video segment at the M-th level where the participated candidate frame locates.

In step S610, the participated candidate frame with the largest number of votes is selected as a candidate frame of the video segments at the M-th level. Herein, it can be said that one round of selection is completed. In the following step S612, it can be determined whether a next round of selection needs to be executed.

In step S612, it is determined whether the number of the selected candidate frames at the M-th level has reached a predetermined number. In case that the number of the selected candidate frames at the M-th level has not reached the predetermined number (No in step S612), it proceeds to step S606. In case that the number of the selected candidate frames at the M-th level has reached the predetermined number (Yes in step S612), it proceeds to step S614. In step S614, it is determined whether the present M-th level is the highest level. If it is, the process proceeds to step S108 in FIG. 1. If it is not, the process proceeds to step S616. In step S616, M is incremented by 1. Then the process proceeds to step S602.

Optionally, in step S608, the step of calculating the number of votes for the participated candidate frame can include the followings: adding, with weights, the number of frames represented by the participated candidate frame and the number of votes supported by other candidate frames, which have not been determined as candidate frames at the M-th level, in the video segment at the M-th level where the participated candidate frame locates, as the number of votes for the participated candidate frame. For example, the number of votes for the participated candidate frame can be determined optionally by the following formula:

$$V=R+S$$

In the above formula, V represents the number of votes for the participated candidate frame, R is the number of frames represented by the participated candidate frame, and S represents the number of votes supported by other candidate frames, which have not been determined as candidate frames at the M-th level, in the video segment at the M-th level where the participated candidate frame locates, where S is a non-negative value. Assuming the M-th level is a scene level, S represents the number of votes supported by other candidate frames, which have not been determined as candidate frames at the scene level, in the scene where the participated candidate frame locates.

In the above formula, the sum of V and the total number of the frames represented by the determined candidate frames at the M-th level in the video segment at the M-th level where the participated candidate frame locates is not greater than the total number of the frames of the video segment at the M-th level where the participated candidate frame locates. Assuming the M-th level is a scene level, the sum of V and the total number of the frames represented by the determined candidate frames at the scene level in the scene where the participated candidate frame locates is not greater than the total number of the frames of the scene where the participated candidate frame locates.

In the above formula, both the weights for R and S are assigned as 1. However the embodiments of the present invention are not limited to these weights. In an example, the weights in the adding with weights in step S608 can depend on a relation between the number of the determined candidate frames at the M-th level in the video segment at the M-th level where the participated candidate frame locates and the total number of the determined candidate frames at the M-th level, and/or a relation between the number of the frames represented by the participated candidate frame and the total number of the frames in the video segment at the M-th level where the participated candidate frame locates, and/or a relation between the number of the frames represented by the participated candidate frame and the total number of the frames represented by the candidate frames, which have not been determined as candidate frames at the M-th level, in the video segment at the M-th level where the participated candidate frame locates. In an example, the weights in the adding with weights in step S608 may be not less than 0 and not greater than 1.

In an example, assuming X is a proportion of the number of the frames represented by the participated candidate frame to the total number of the frames of the video segment at the M-th level where the participated candidate frame locates, Y is a proportion of the number of the frames represented by the participated candidate frame to the total number of the frames represented by the candidate frames, which have not been determined as candidate frames at the M-th level, in the video segment at the M-th level where the participated candidate frame locates, and Z is a proportion of the number of the determined candidate frames at the M-th level in the video segment at the M-th level where the participated candidate frame locates to the total number of the determined candidate frames at the M-th level, then weights either X or Y can be taken as the weight for S; and a weight (1-Z) can be taken as the weight for R or S and can also be taken as the weight for both R and S simultaneously.

Optionally, an upper limit value of the number of the votes supported by other candidate frames, which have not been determined as candidate frames at the M-th level, in the video segment at the M-th level where the participated candidate frame locates can increase monotonously along with the total number of the frames represented by the other candidate frames, which have not been determined as candidate frames at the M-th level, in the video segment. For example, assuming that the M level is a scene level, then the upper limit value of the number of the votes supported by other candidate frames, which have not been determined as candidate frames at the scene level, in the scene where the participated candidate frame locates can increase monotonously along with the total number of the frames represented by the other candidate frames which have not been determined as candidate frames at the scene level in the scene.

Figure 3:
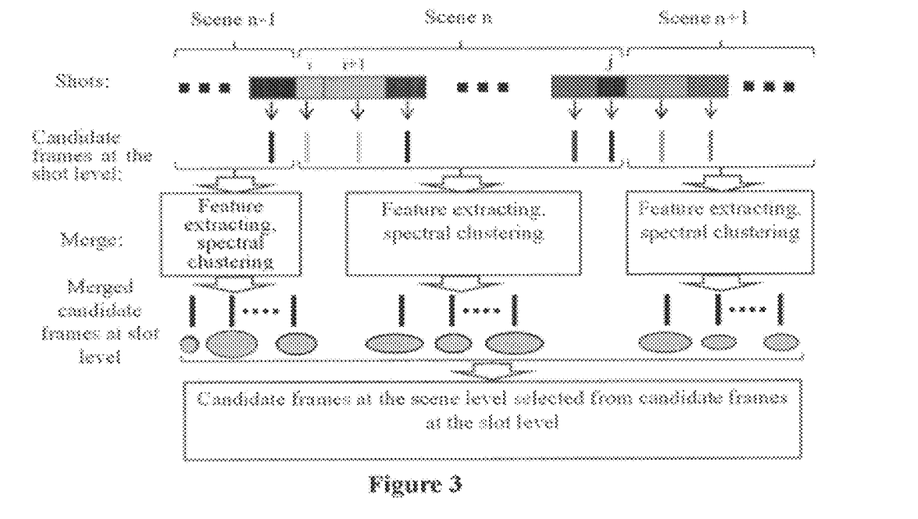
FIG. 3 is a schematic diagram of a method for implementing the extracting of key frames from a video according to an embodiment of the present invention.

FIG. 3 is a schematic diagram of a more specific example for implementing the method for extracting key frames from a video according to the embodiment of the present invention. In the example, a video is divided into two levels of video segments. The video segments at the lower level are shots, and the video segments at the higher level are scenes. As shown in FIG. 3, the video can be divided into a plurality of scenes, such as scene n−1, scene n and scene n+1, where n is an integer. Further, each scene can include a plurality of shots. For example, the scene n includes shot i, shot i+1, . . . , and shot j, where i and j are both integers and j is greater than or equal to i. A frame that can represent a shot (i.e., a candidate frame at the shot level) is selected from each corresponding shot. Processing for removing approximately repetitive frames is performed on all the representative frames at the shot level as selected from each scene, for example, the approximately repetitive frames can be removed by using a method of feature extracting and spectral clustering. Here the processing is also called merging processing. Then candidate frames at the scene level are selected from the merged candidate frames at the shot level by using the selection method. Since a scene is the highest level in this example, the candidate frames at the scene level are taken as the key frames of the video.

An apparatus 400 for extracting key frames from a video according to an embodiment of the present invention is described below with reference to FIG. 4.

Figure 4:
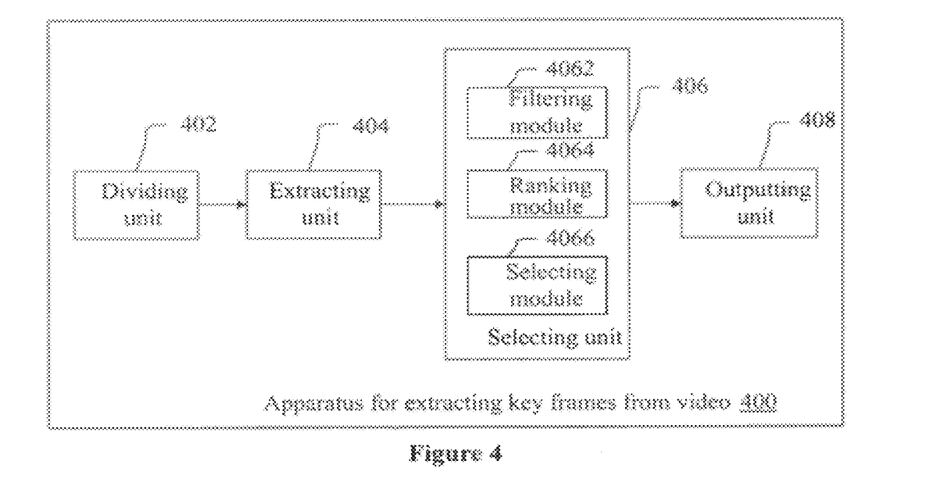
FIG. 4 is a block diagram of an apparatus for extracting key frames from a video according to an embodiment of the present invention.

As shown in FIG. 4, the apparatus 400 for extracting key frames from a video can include a dividing unit 402, an extracting unit 404, a selecting unit 406 and an outputting unit 408.

Specifically, the dividing unit 402 can be configured to divide the video into multiple levels of video segments. Each video segment at a non-lowest level includes one or more video segments at the next lower level. The multiple levels range from a first level to an N-th level, where N is an integer greater than 1, the first level is the lowest level, and the N-th level is the highest level.

For example, the dividing unit 402 can divide the video into two levels of video segments. The video segments at the lower level are shots or sub-shots, and the video segments at the higher level are video chapters or scenes. In fact, the dividing unit 402 can divide the video into more than two levels of video segments. For example, the dividing unit 402 can divide the video into three or four levels of video segments according to a specific requirement.

The extracting unit 404 can be configured to extract, from video segments at a non-highest level of the video, candidate frames at the non-highest level. The selecting unit 406 can be configured to, for each level from a next higher level of the non-highest level to the highest level, select zero, one or more candidate frames at the level from the candidate frames at the next lower level included in the video segments at the level. The outputting unit 408 can be configured to output the candidate frames at the highest level as the key frames of the video.

In an example, the selecting unit 406 can include a ranking module 4064 and a selecting module 4066.

Specifically, the ranking module 4064 can be configured to, for at least one M-th level ranging from the next higher level of the non-highest level to the highest level, and for each the video segment at the M-th level, rank the candidate frames at the (M−I)-th level in the video segment in order of large to small numbers of the frames represented by the candidate frames. Optionally, the above mentioned M-th level can comprise the highest level.

The selecting module 4066 can be configured to repeat the following operations with respect to the at least one M-th level until a predetermined number of candidate frames at the M-th level are selected: for each video segment at the M-th level, choosing a candidate frame which has not been selected as a candidate frame at the M-th level and is the highest ranked in the candidate frames at the (M−1)-th level in the video segment to participate in the selection; calculating the number of votes for each participated candidate frame according to the number of the frames represented by the participated candidate frame and the number of votes supported by other candidate frames, which have not been determined as candidate frames at the M-th level, in the video segments at the M-th level where the participated candidate frame locates, wherein the sum of the number of votes for each participated candidate frame and the total number of frames represented by the determined candidate frames at the M-th level in the video segment at the M-th level where the participated candidate frame locates is not greater than the total number of frames of the video segment at the M-th level where the participated candidate frame locates; and selecting the participated candidate frame with the largest number of votes as a candidate frame of the video segments at the M-th level.

Optionally, the selecting module 4066 can add, with weights, the number of the frames represented by each participated candidate frame and the number of the votes supported by other candidate frames, which have not been determined as candidate frames at the M-th level, in video segment at the M-th level where the participated candidate frame locates, as the number of votes for the participated candidate frame.

In an example, the weights in the adding with weights can depend on a relation between the number of the determined candidate frames at the M-th level in the video segment at the M-th level where the participated candidate frame locates and the total number of the determined candidate frames at the M-th level, and/or a relation between the number of the frames represented by the participated candidate frame and the total number of the frames in the video segment at the M-th level where the participated candidate frame locates, and/or a relation between the number of the frames represented by the participated candidate frame and the total number of the frames represented by the candidate frames, which have not been determined as candidate frames at the M-th level, in the video segment at the M-th level where the participated candidate frame locates.

In addition, optionally, in the selecting module 4066, an upper limit value of the number of the votes supported by other candidate frames, which have not been determined as candidate frames at the M-th level, in the video segment at the M-th level where the participated candidate frame locates can increase monotonously along with the total number of the frames represented by the other candidate frames, which have not been determined as candidate frames at the M-th level, in the video segment.

Optionally, the selecting unit 406 can further include a filtering module 4062. The filtering module 4062 can be configured to, for the at least one M-th level, remove approximately repetitive candidate frames from the candidate frames at the (M−1)-th level in the video segment at the at least one M-th level and send the candidate frames in which the approximately repetitive candidate frames have been removed to the ranking module 4064.

In an example, the apparatus 400 for extracting key frames from a video can further include a setting unit (not shown). The setting unit can be configured to set the number of the key frames according the length of the video and/or preference of a user.

Figure 2:
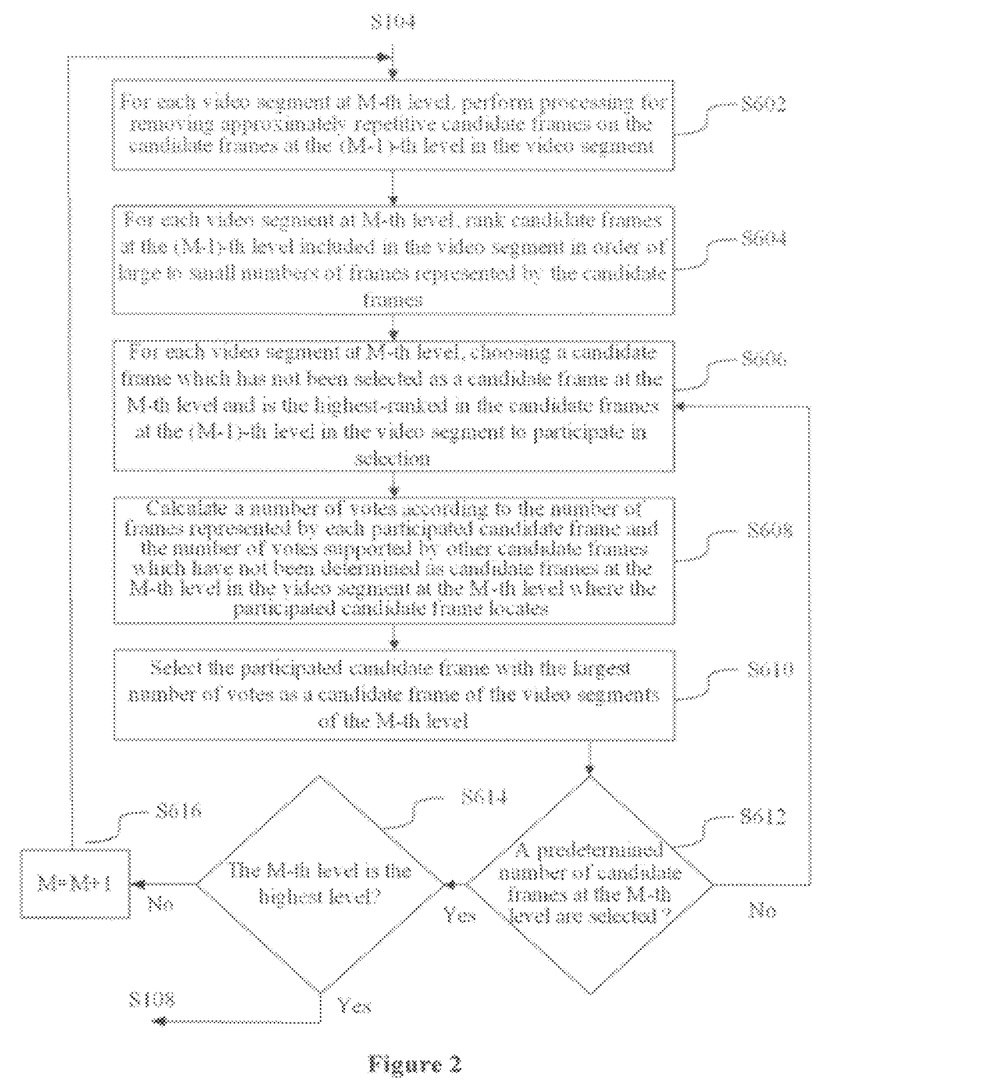
FIG. 2 is a flowchart of a method for selecting candidate frames at a current level from candidate frames at the next lower level in the method for extracting key frames from a video according to an embodiment of the present invention.

Further details of the operations of the parts the apparatus 400 can be found from the above embodiments described in combination with FIGS. 1-3, and will not be detailed here.

By the embodiments of the present invention, proportions of key frames from different content units of a video in a list of the key frames of the video can be balanced well, so as to achieve an effectively understood preview by using key frames as few as possible.

Figure 5:
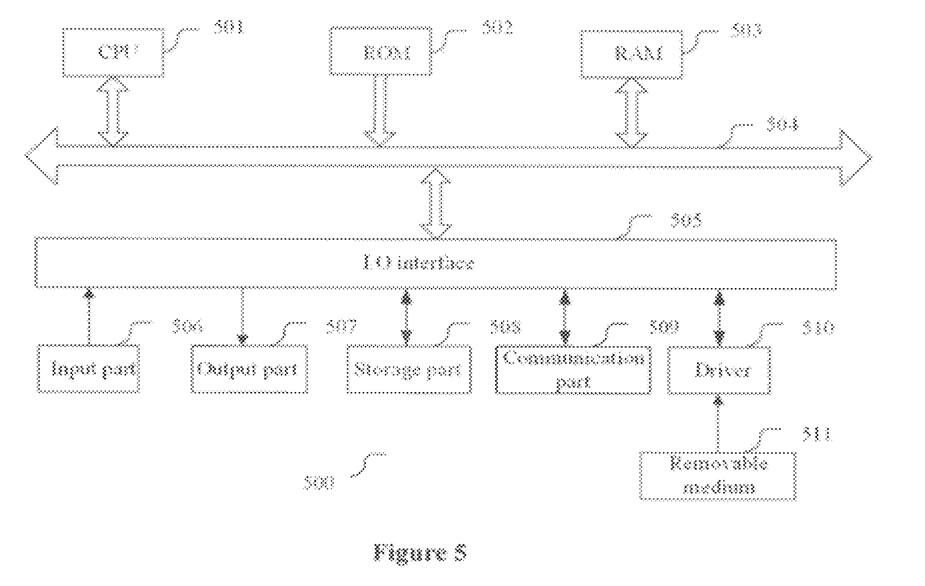
FIG. 5 is a structural diagram of an example of a computing apparatus for implementing the method and apparatus for extracting key frames from a video of the present invention.

In FIG. 5, a central processing unit (CPU) 501 executes various processes according to programs stored in a read-only memory (ROM) 502 or programs loaded from a storage part 508 to a random access memory (RAM) 503. Data needed when the CPU 501 executes the various processes are also stored in the RAM 503 as required. The CPU 501, the ROM 502 and the RAM 503 are connected with each other via a bus 504. An input/output interface 505 is also connected to the bus 504.

The following components are connected to the input/output (I/O) interface 505: an input part 506 (including a keyboard, a mouse and etc.), an output part 507 (including a display such as a cathode-ray tube (CRT) or a liquid crystal display (LCD), and a speaker, etc.), the storage part 508 (including a hard disk, etc.), and a communication part 509 (including a network interface card such as an LAN card, a MODEM and etc.). The communication part 509 executes communication processing via a network such as the Internet. A driver 510 can also be connected to the input/output interface 505 as required. A removable medium 511 such as a magnetic disk, an optical disk, a magneto-optical disk or a semiconductor memory can be mounted on the driver 510 as required, such that the computer program read out therefrom is installed into the storage part 508 as required.

In the case that the above series of processes are implemented by software, a program constituting the software is loaded from a network such as the Internet or from a storage medium such as the removable medium 511.

It is to be understood by those skilled in the art that such storage medium is not limited to the removable medium 511 storing programs therein and distributing the programs to a user(s) dependently from a device. Examples of the removable medium 511 include a magnetic disk (including a Floppy Disk (FD) (registered trademark)), an optical disk (including a Compact Disk-Read Only Memory (CD-ROM) and a Digital Versatile Disc (DVD)), a magneto-optical disk (including a Microdisk (MD) (registered trademark)) and a semiconductor memory. Alternatively, the storage medium can be the ROM 502, a hard disk contained in the storage part 508, etc., in which programs are stored and which is distributed to a user(s) along with a device the storage medium is contained in.

The present invention further provides a program product storing machine-readable instruction codes. The instruction codes, when read and executed by a machine, can execute the methods according to the embodiments of the present invention.

Correspondingly, the storage medium for carrying the program product storing machine-readable instruction codes is also incorporated in the disclosure of the present invention. The storage medium includes, but is not limited to, a flexible disk, an optical disk, a magneto-optical disk, a storage card and a storage stick.

Those skilled in the art should understand that what is exemplified here is exemplary and the present invention is not limited thereto.

In the present specification, such expressions as "first", "second" and "N-th", etc., are only for literally distinguishing the described features so as to describe the present invention clearly. Therefore, the expressions should not be regarded as having any restrictive sense.

As an example, the various steps of the above mentioned method and the various constituting modules and/or units of the above mentioned apparatus can be implemented as software, firmware, hardware or combinations thereof, and act as a part of a corresponding apparatus. The specific approaches or modes that can be used to configure the various constituting modules and units in the above mentioned apparatus by software, firmware, hardware or combinations thereof are well known for those skilled in the art, and will not be described repeatedly here.

As an example, in case of being implemented by software or firmware, a program constituting the software can be loaded from a storage medium or network to a computer having a specialized hardware structure (such as the general computer 500 shown in FIG. 5), and the computer can execute various functions when being loaded with various programs.

In the above description of the specific embodiments of the present invention, features described and/or illustrated with respect to one embodiment can be used in one or more other embodiments in an identical or similar manner, be combined with features in other embodiments, or replace features in other embodiments.

It is to be emphasized that, the term "comprise/include", as used in the present description, refers to the presence of features, elements, steps or components, but does not exclude the presence or addition of one or more other features, elements, steps or components.

In addition, the methods of the present invention are not limited to being executed in the temporal orders as described in the specification, but can also be executed in other temporal order, in parallel or separately. Therefore, the execution orders of the methods described in the present specification do not constitute limitations to the technical scope of the present invention.

While the present invention has been disclosed with reference to descriptions for the specific embodiments of the present invention, it should be understood that all of the above mentioned embodiments and examples are illustrative instead of limiting. Those skilled in the art can devise various modifications, improvements or equivalents for the present invention, within the spirit and scope of the appended claims. The modifications, improvements or equivalents should also be considered as being included in the protection scope of the present invention.

What is claimed is:

1. A method for extracting key frames from a video, comprising:

dividing the video into multiple levels of video segments, wherein each video segment at a non-lowest level comprises one or more video segments at the next lower level, and the multiple levels range from a first level to an N-th level, where N is an integer greater than 1, the first level is the lowest level, and the N-th level is the highest level;

extracting, from the video segments of the video at a non-highest level, candidate frames at the non-highest level;

for each level from a next higher level of the non-highest level to the highest level, selecting zero, one or more candidate frames at the level from the candidate frames at the next lower level comprised in each video segment at the level;

removing approximately repetitive frames of the candidate frames at the highest level; and after removing the approximately repetitive frames, outputting the candidate frames at the highest level as the key frames of the video, wherein for at least one M-th level ranging from the next higher level of the non-highest level to the highest level, M being an integer greater than 1, the selecting the candidate frames at the M-th level from the candidate frames at a (M−1)-th level comprised in each video segment at the M-th level comprises:

for each video segment at the M-th level, ranking the candidate frames at the (M−1)-th level comprised in the video segment in order of large to small numbers of the frames represented by the candidate frames at the (M−1)-th level; and repeating the following steps for selection until a predetermined number of candidate frames at the M-th level are selected using processing circuitry:

for each video segment at the M-th level, choosing a candidate frame which has not been selected as a candidate frame at the M-th level and is the highest ranked in the candidate frames at the (M−1)-th level in the video segment to participate in the selection;

calculating a number of votes for each participated candidate frame according to a number of frames represented by each participated candidate frame and a number of votes supported by other candidate frames, which have not been determined as candidate frames at the M-th level, in the video segment at the M-th level where the participated candidate frame locates, wherein a sum of the number of votes for each participated candidate frame and the total number of frames represented by determined candidate frames at the M-th level in the video segment at the M-th level where the participated candidate frame locates is not greater than the total number of the frames of the video segment at the M-th level where the participated candidate frame locates; and selecting the participated candidate frame with the largest number of votes as a candidate frame of the video segments at the M-th level.

2. The method according to claim 1, wherein the calculating the number of the votes for each participated candidate frame comprises adding, with weights, the number of the frames represented by each participated candidate frame and the number of the votes supported by other candidate frames, which have not been determined as candidate frames at the M-th level, in the video segment at the M-th level where the participated candidate frame locates, as the number of the votes for the participated candidate frame.

3. The method according to claim 2, wherein the weights in the adding with weights depend on a relation between the number of the determined candidate frames at the M-th level in the video segment at the M-th level where the participated candidate frame locates and the total number of the determined candidate frames at the M-th level, and/or a relation between the number of the frames represented by the participated candidate frame and the total number of the frames in the video segment at the M-th level where the participated candidate frame locates, and/or a relation between the number of the frames represented by the participated candidate frame and the total number of the frames represented by the candidate frames, which have not been determined as candidate frames at the M-th level, in the video segment at the M-th level where the participated candidate frame locates.

4. The method according to claim 1, wherein the multiple levels of video segments comprise two levels of video segments, and in the two levels of video segments, the video segments at a lower level are shots or sub-shots, and the video segments at a higher level are video chapters or scenes.

5. The method according to claim 1, further comprising removing approximately repetitive candidate frames from the candidate frames at the (M−1)-th level in the video segment before ranking the candidate frames at the (M−1)-th level in the video segment in order of large to small numbers of frames represented by the candidate frames.

6. The method according to claim 1, wherein an upper limit value of the number of the votes supported by other candidate frames, which have not been determined as candidate frames at the M-th level, in the video segment at the M-th level where the participated candidate frame locates increases monotonously along with the total number of the frames represented by the other candidate frames which have not been determined as candidate frames at the M-th level.

7. The method according to claim 1, further comprising setting the number of the key frames according to a length of the video and/or preference of a user.

8. The method according to claim 1, wherein the at least one M-th level comprises the highest level.

9. An apparatus for extracting key frames from a video, comprising:

circuitry configured to:

divide the video into multiple levels of video segments, wherein each video segment at a non-lowest level comprises one or more video segments at the next lower level, and the multiple levels range from a first level to an N-th level, where N is an integer greater than 1, the first level is the lowest level, and the N-th level is the highest level;

extract, from the video segments of the video at a non-highest level, candidate frames at the non-highest level;

for each level from a next higher level of the non-highest level to the highest level, select zero, one or more candidate frames at the level from the candidate frames at the next lower level comprised in each video segment at the level;

remove approximately repetitive frames of the candidate frames at the highest level; and after the removing the approximately repetitive frames, output the candidate frames at the highest level as the key frames of the video, for at least one M-th level ranging from the next higher level of the non-highest level to the highest level, for each video segment at the M-th level, rank the candidate frames at the (M−1)-th level in the video segment in order of large to small numbers of the frames represented by the candidate frames at the (M−1)-th level; and for the at least one M-th level, repeat following operations until a predetermined number of candidate frames at the M-th level are selected:

for each video segment at the M-th level, choose a candidate frame which has not been selected as a candidate frame at the M-th level and is the highest ranked in the candidate frames at the (M−1)-th level in the video segment to participate in selection;

calculate a number of votes for each participated candidate frame according to a number of frames represented by each participated candidate frame and a number of votes supported by other candidate frames, which have not been determined as candidate frames at the M-th level, in the video segment at the M-th level where the participated candidate frame locates, wherein a sum of the number of votes for each participated candidate frame and the total number of frames re presented b determined candidate frames at the M-th level in the video segment at the M-th level where the participated candidate frame locates is not greater than the total number of the frames of the video segment at the M-th level where the participated candidate frame locates; and select the participated candidate frame with the largest number of votes as a candidate frame of the video segments at the M-th level.

10. The apparatus according to claim 9, wherein the circuitry is further configured to add with weights the number of the frames represented by each participated candidate frame and the number of the votes supported by other candidate frames, which have not been determined as candidate frames at the M-th level, in the video segment at the M-th level where the participated candidate frame locates, as the number of the votes for the participated candidate frame.

11. The apparatus according to claim 10, wherein the weights in the adding with weights depend on a relation between the number of the determined candidate frames at the M-th level in the video segment at the M-th level where the participated candidate frame locates and the total number of the determined candidate frames at the M-th level, and/or a relation between the number of the frames represented by the participated candidate frame and the total number of the frames in the video segment at the M-th level where the participated candidate frame locates, and/or a relation between the number of the frames represented by the participated candidate frame and the total number of the frames represented by the candidate frames, which have not been determined as candidate frames at the M-th level, in the video segment at the M-th level where the participated candidate frame locates.

12. The apparatus according to claim 9, wherein the multiple levels of video segments comprise two levels of video segments, and in the two levels of video segments, the video segments at a lower level are shots or sub-shots, and the video segments at a higher level are video chapters or scenes.

13. The apparatus according to claim 9, wherein the circuitry is further configured to, for the at least one M-th level, remove approximately repetitive candidate frames from the candidate frames at the (M−1)-th level in the video segments and send the candidate frames in which the approximately repetitive candidate frames have been removed to be ranked.

14. The apparatus according to claim 9, wherein, an upper limit value of the number of the votes supported by other candidate frames, which have not been determined as candidate frames at the M-th level, in the video segment at the M-th level where the participated candidate frame locates increases monotonously along with the total number of the frames represented by the other candidate frames which have not been determined as candidate frames at the M-th level.

15. The apparatus according to claim 9, wherein the circuitry is further configured to set the number of the key frames according to a length of the video and/or preference of a user.

16. The apparatus according to claim 9, wherein the at least one M-th level comprises the highest level.

17. The method according to claim 1, wherein the approximately repetitive frames are removed using feature extracting and spectral clustering.

18. The apparatus according to claim 9, wherein the circuitry is further configured to remove the approximately repetitive frames using feature extracting and spectral clustering.

* * * * *